S. S. BATLOUNEY.
DIRECTION SIGNAL FOR VEHICLES.
APPLICATION FILED DEC. 1, 1917.

1,276,711.

Patented Aug. 27, 1918.

INVENTOR
Shoukry S. Batlouney,
By Elgin C. Unice,
attorney.

UNITED STATES PATENT OFFICE.

SHOUKRY S. BATLOUNEY, OF PORTLAND, MAINE.

DIRECTION-SIGNAL FOR VEHICLES.

1,276,711.     Specification of Letters Patent.     Patented Aug. 27, 1918.

Application filed December 1, 1917. Serial No. 204,993.

*To all whom it may concern:*

Be it known that I, SHOUKRY S. BATLOUNEY, a citizen of the United States, residing at Portland, in the county of Cumberland and State of Maine, have invented certain new and useful Improvements in Direction-Signals for Vehicles, of which the following is a specification.

This invention relates to improvements in signals for use on vehicles. It is designed to warn drivers of vehicles following of the intention of the driver of the vehicle ahead to stop the vehicle or change its course.

It is specially designed to provide a device which is simple and inexpensive in construction and one so constructed and located as to be quickly and conveniently operated by the driver.

Figure 1:
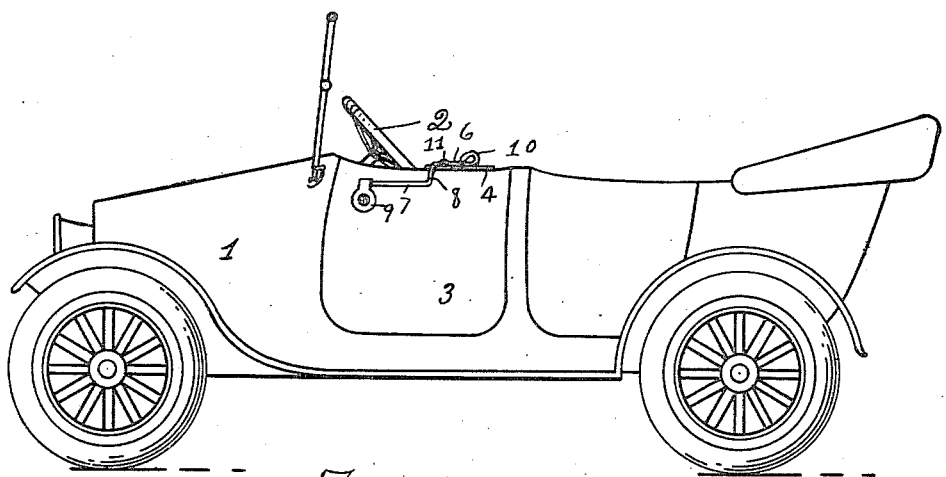
Figure 2:
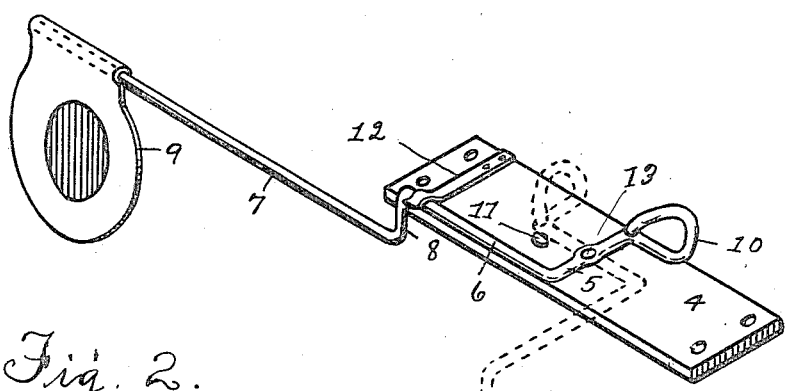

In the drawings herewith accompanying and forming a part of this application I have for the purpose of illustration shown my signal applied to an automobile and Figure 1 is an elevation of an automobile with my signal attached thereto, and Fig. 2 is a perspective view of the signal shown mounted upon a plate which is adapted to be secured to the vehicle.

In said drawings 1 is an automobile, 2 the steering wheel and 3 a door. I have shown the signal mounted upon a plate 4 adapted to be attached in any convenient manner to the top of the door or other part of the vehicle. The signal supporting arm comprises a transverse section 5, two longitudinal sections 6 and 7 and an offset 8 between said longitudinal sections. To the end of section 7 the signal proper 9 is attached. The arm is provided with an operating handle 10. A stationary post 11 limits the outward movement of the arm and signal to proper position. A stationary spring catch 12 is adapted to lock the arm and signal in inoperative position. The signal carrying arm may be made from a single piece of wire bent to the form described, but it is not intended to limit the invention in this respect. The transverse section of the signal arm is pivotally mounted on a pin 13 set in the vehicle or in the plate, when a plate is used. The operating handle of the signal carrying arm should be located in position to be operated either by the hand or elbow of the driver. This is of very great importance, because frequently it happens that the driver needs both hands on the steering mechanism, especially at a time when a signal is to be given.

I claim:

1. In a device of the character described a vehicle, a hand steering mechanism, a signal carrying arm pivotally secured to the vehicle, said arm comprising a transverse section, two longitudinal sections and an offset between said longitudinal sections, an operating handle at one end of the arm and a signal at the other end of the arm and means for yieldingly locking the carrying arm in position.

2. In a device of the character described, a vehicle, a hand steering mechanism, a horizontal plate secured to the vehicle, a horizontally movable carrying arm pivotally secured to the plate, said arm having a signal at one end and an operating handle at the other end, the operating handle being located relative to the handhold of said steering mechanism so that the operator may operate the signal with his elbow while steering the vehicle with his hand, and means for yieldingly locking the carrying arm to the plate.

In testimony whereof I affix my signature.

SHOUKRY S. BATLOUNEY.